United States Patent
Kizawa et al.

(10) Patent No.: US 7,315,149 B2
(45) Date of Patent: Jan. 1, 2008

(54) VEHICLE GENERATOR

(75) Inventors: Toshikazu Kizawa, Kariya (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/707,077

(22) Filed: Feb. 16, 2007

(65) Prior Publication Data

US 2007/0200534 A1    Aug. 30, 2007

(30) Foreign Application Priority Data

Feb. 16, 2006   (JP)   ............... 2006-038720

(51) Int. Cl.
*H20K 7/00*    (2006.01)
*H20P 9/00*    (2006.01)

(52) U.S. Cl. ............... 322/28; 322/19; 322/24; 322/25; 322/59

(58) Field of Classification Search ............... 322/28, 322/59, 19, 24, 25
See application file for complete search history.

(56) References Cited

U.S. PATENT DOCUMENTS 6,271,649 B1 *   8/2001   Iwatani ............... 322/29
6,456,048 B2 *   9/2002   Taniguchi et al. ............... 322/28
6,707,276 B2 *   3/2004   Takahashi et al. ............... 322/28
7,224,148 B2 *   5/2007   Watanabe et al. ............... 322/59

FOREIGN PATENT DOCUMENTS

JP    A 2002-315397    10/2002

* cited by examiner

*Primary Examiner*—Darren Schuberg
*Assistant Examiner*—Iraj A. Mohandesi
(74) *Attorney, Agent, or Firm*—Oliff & Berridge PLC

(57) ABSTRACT

The vehicle generator includes a rotor around which a field winding is wound, a stator around which an armature winding is wound, a rectifier rectifying an AC voltage induced in the armature winding to generate a DC output current. The rectifier has a plurality of rectifying elements mounted to a current path section thereof, the DC output current flowing through the current path section to reach an output terminal of the vehicle generator. The vehicle generator further includes a first voltage detector circuit detecting a voltage difference between two points of the current path section located along a direction in which the output current flows, and an output current calculating circuit calculating a value of the output current on the basis of the voltage difference detected by the first voltage detector circuit and a resistance value between the two points of the current path section.

7 Claims, 3 Drawing Sheets

VEHICLE GENERATOR

CROSS-REFERENCE TO RELATED APPLICATION

This application is related to Japanese Patent Application No. 2006-38720 filed on Feb. 16, 2006, the contents of which are hereby incorporated by reference.

BACKGROUND OF THE INVENTION

1. Field of the Invention

The present invention relates to a generator mounted on a vehicle such as a passenger car or a truck.

2. Description of Related Art

There is known a vehicle generator provided with a function of detecting an output current thereof, as disclosed, for example, in Japanese Patent Application Laid-open No. 2002-315397. Such a vehicle generator includes a current detector disposed so as to surround an output terminal thereof. This current detector is constituted by a U-shaped laminated core disposed around the output terminal, a rectangular parallelepiped laminated core disposed at the ends of the U-shaped laminated core, and a current detecting coil wound around a bobbin through which the rectangular parallelepiped laminated core is inserted. The output current flowing through the output terminal can be determined on the basis of the output of the current detecting coil.

However, since the current detector of the type described above has a complicated structure, and accordingly its production cost is high, the production cost of a vehicle generator provided with such a current detector becomes high. In addition, since this type of the current detector including the laminated cores and current detecting coil is a relatively heavy component, the weight of a vehicle generator becomes large when such a current detector is mounted to the vehicle generator.

SUMMARY OF THE INVENTION

The present invention provides a vehicle generator comprising:

a rotor around which a field winding is wound;

a stator around which an armature winding is wound, the armature winding generating an AC voltage depending on a rotating magnetic field generated by the field winding;

a rectifier rectifying the AC voltage to generate a DC output current, the rectifier having a plurality of rectifying elements mounted to a current path section thereof, the DC output current flowing through the current path section to reach an output terminal of the vehicle generator;

a first voltage detector circuit detecting a voltage difference between two points of the current path section located along a direction in which the output current flows; and an output current calculating circuit calculating a value of the output current on the basis of the voltage difference detected by the first voltage detector circuit and a resistance value between the two points of the current path section.

The vehicle generator of the invention is configured to detect its output current by detecting a voltage difference between specific two points within the rectifier located along a direction in which the output current flows. This eliminates mounting current detecting components that are heavy in weight and have complicated structures on the vehicle generator. Accordingly, the vehicle generator of this invention is low in production cost and weight compared to the conventional vehicle generator having the function of detecting the output current thereof.

The vehicle generator may further comprise a temperature-compensating circuit correcting the resistance value in accordance with a temperature of the rectifier.

The vehicle generator may further comprise a second voltage detector circuit detecting a voltage drop across one of the rectifying elements, and the temperature-compensating circuit may correct the resistance value in accordance with the voltage drop detected by the second voltage detector circuit.

The output current calculating circuit may have a function of adjusting calculation result of the DC output current in accordance with an external instruction including data concerning an over-time characteristic change of a specific component of the rectifier.

The vehicle generator may further comprise a power control circuit formed in an IC circuit controlling a passage of an excitation current to the field winding. In this case, the first voltage detector circuit, the output current calculating circuit, and the output current calculating circuit may be formed in the IC circuit.

Other advantages and features of the invention will become apparent from the following description including the drawings and claims.

PREFERRED EMBODIMENTS OF THE INVENTION

Figure 1:
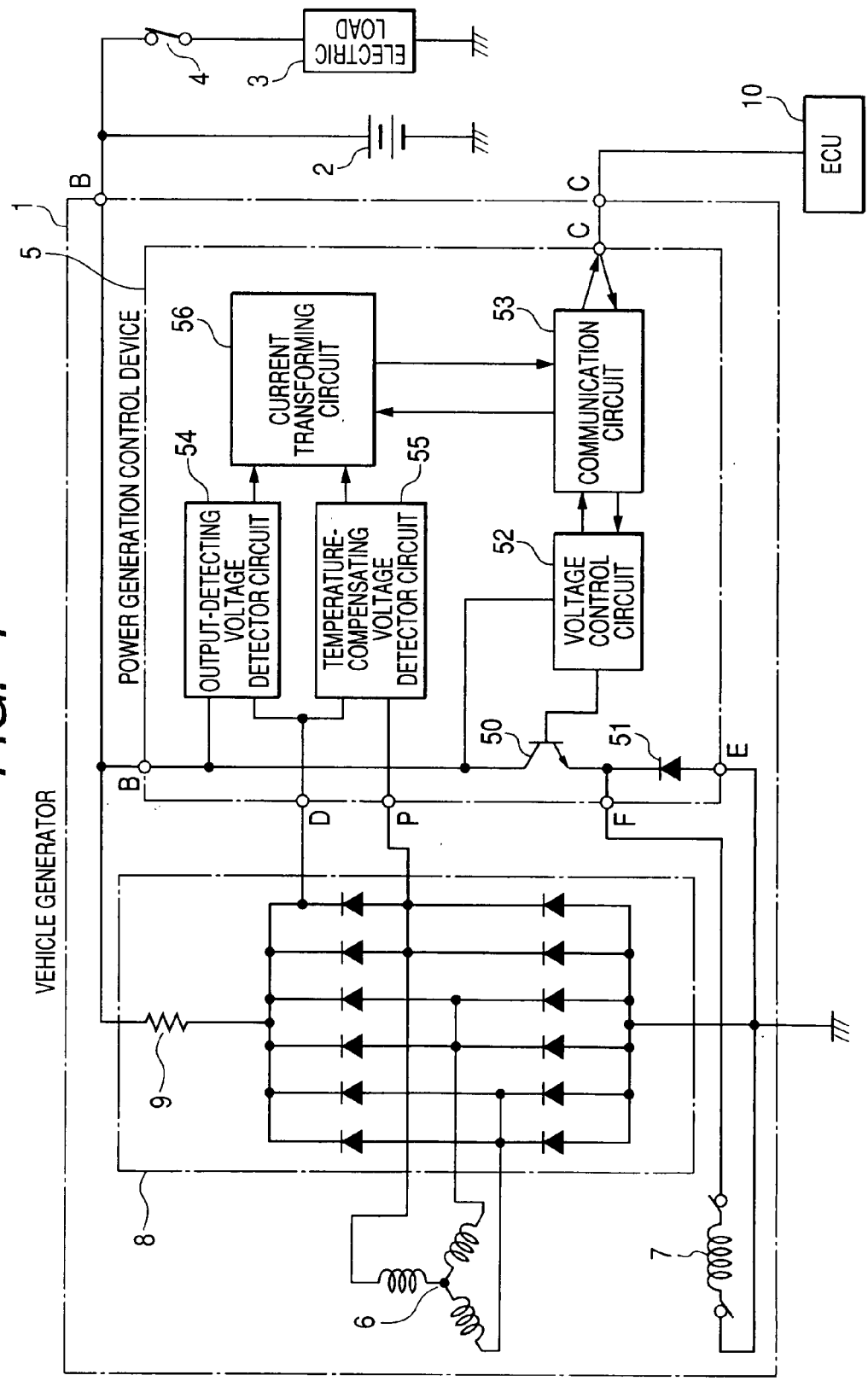
FIG. 1 is a diagram showing a structure of a vehicle generator according to an embodiment of the invention.

FIG. 1 is a diagram showing a structure of a vehicle generator 1 according to a first embodiment of the invention, which is connected to a battery 2, an electric load 3 through a load switch 4, and an ECU (Electronic Control Unit).

As shown in this figure, the vehicle generator 1 includes a power generation control device 5, an armature winding 6, a field winding 7, and a rectifier 8. The vehicle generator 1 is belt-drive by a vehicle engine (not shown) The field winding 7, which is wound around magnetic poles (not shown) to constitute a rotor generates a rotating magnetic field. The armature winding 6, which is a multi-phase winding (three-phase winding in this embodiment) wound around an armature core (not shown) to constitute an armature (stator), generates an electromotive force thereacross as an AC output depending on the rotating magnetic field generated by the field winding 7. This AC output is supplied to the rectifier 8 to be full-wave rectified. The output of the rectifier 8 is supplied, as an output of the vehicle generator 1, to the battery 2, and to the electric load 3 through the load switch 4. The output of the vehicle generator 1 depends on the rotational speed of the rotor, and an excitation current flowing through the field winding 7 which is controlled by the power generation control device 5. The power generation control device 5 is connected to the ECU 10 through a C-terminal (communication terminal).

Figure 2:
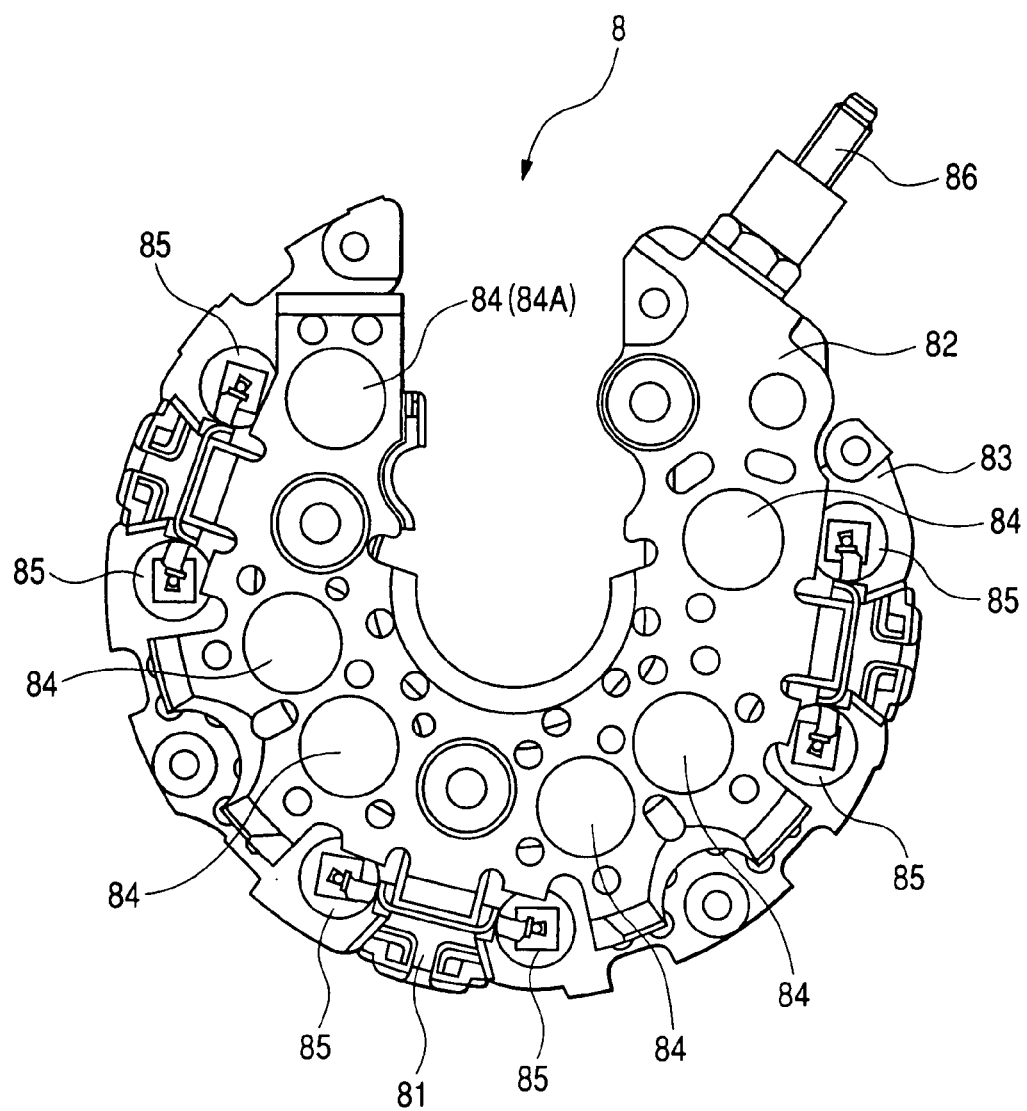
FIG. 2 is a plan view of a rectifier mounted to the vehicle generator shown in FIG. 1.

FIG. 2 is a plan view of the rectifier 8. As shown in this figure, the rectifier 8 includes a terminal block 81 housing therein wiring electrodes, a positive side radiator plate 82 to which positive side rectifying elements 84 are mounted, and a negative side radiator plate 83 to which negative side rectifying elements 85 are mounted, and which is opposed to the positive side radiator plate 82. More specifically, the positive-side radiator plate 82 is formed with six holes into which six positive side rectifying elements 84 are pressed. Likewise, the negative side radiator plate 83 is formed with six holes into which six negative side rectifying elements 85 are pressed.

The positive side radiator plate 82 is horseshoe-shaped. An output terminal (B-terminal) 86 is disposed in the vicinity of one end of the positive side radiator plate 82. Here, one of the six positive side rectifying elements 84, which is disposed in a place most distant from the output terminal 86, and closest to the other end of the positive side radiator plate 82 is designated by the reference character 84A. A lead is connected to the positive side rectifying element 84A at one end thereof, and connected to a D-terminal (to be described later) at the other end thereof. In this embodiment, the positive side radiator plate 82 doubles as a current path section through which the output current flows to reach the output terminal 86. The resistance between the positive side rectifying element 84A and the output terminal 86 corresponds to a resistor 9 shown in FIG. 1.

Next, details of the power generation control device 5 are explained. The power generation control device 5 includes a switching element 50, a fly-wheel diode 51, a voltage control circuit 52, a communication circuit 53, an output-detecting voltage detector circuit 54, a temperature-compensating voltage detector circuit 55, and a current transforming circuit 56. These circuit components of the power generation control device 5 except minor components such as a noise absorbing capacitor (not shown) are formed as an IC. Accordingly, the power generation control device 5 can be easily produced by modifying a mask pattern used for producing a conventional power generation control device not including the output-detecting voltage detector circuit 54, temperature-compensating voltage detector circuit 55, and current transforming circuit 56.

The switching element 50 has a base connected to the voltage control circuit 52, a collector connected to the output terminal (B-terminal) of the vehicle generator, and an emitter connected to the E-terminal (ground terminal) through the fly-wheel diode 51. The emitter of the switching element 50 is also connected the field winding 7 through an F-terminal. When the switching element 50 is turned on, the excitation current is allowed to pass to the field winding 7, and when the switching element 50 is turned off, the passage of the excitation current is stopped. The fly-wheel diode 51, which is parallel-connected to the field winding 7, allows a surge current to circulate in the field winding 7 when the switching element 50 is turned off.

The voltage control circuit 52 compares the output voltage of the vehicle generator 1 with a target voltage value, and on/off controls the switching element 50 in accordance with the comparison results. For example, when the output voltage is lower than the target voltage value, the switching element 50 is turned on at a certain duty ratio. On the other hand, when the output voltage is higher than the target voltage value, the switching element 50 is turned off. The target voltage value is at a value set in accordance with a target voltage setting signal inputted from the communication circuit 53 operating to perform communication with the ECU 10 through the C-terminal (communication terminal).

The communication circuit 53 has a function of generating the target voltage setting signal to be supplied to the voltage control circuit 52 in accordance with data sent from the ECU 10, and a function of transmitting an adjustment factor setting signal (to be described later) to the current transforming circuit 56.

The output-detecting voltage detector circuit 54 operates to detect a voltage across the resistor 9, to thereby detect the output current of the vehicle generator 1. As previously described, the resistor 9 is formed by a resistance component of a portion of the positive side radiating plate 82, that resides between the positive side rectifying element 84A and the output terminal 86. The output-detecting voltage detector circuit 54 detects, as a "rectifier voltage", a voltage difference between the D-terminal connected to the positive side rectifying element 84A and the B-terminal.

The temperature-compensating voltage detector circuit 55 detects, as a "rectifying element voltage", a voltage drop across the positive side rectifying element 84A. The resistor 9 has a positive temperature characteristic in which the resistance value thereof increases with the increase of the temperature of the positive side radiating plate 82. On the other hand, the positive side rectifying element 84A has a negative temperature characteristic in which the voltage thereacross decreases with the increase of the temperature thereof. In this embodiment, these temperature characteristics are used for performing temperature compensation. Incidentally, two positive side rectifying elements 84 are connected in parallel for each phase as shown in FIG. 1. Accordingly, the temperature-compensating voltage detector circuit 55 actually detects a voltage across the parallel connection of the positive side rectifying element 84A and another positive side rectifying element 84. However, since they have substantially the same characteristic, there is no any problem in performing the temperature compensation.

The current transforming circuit 56, which serves as an output current calculating circuit, receives the rectifier voltage outputted from the output-detecting voltage detector circuit 54 and receives the rectifying element voltage outputted from the temperature-compensating voltage detector circuit 55 to calculate the output current of the vehicle generator 1 in accordance with the following equation (1).

$$\text{The output current } I = (V_R/(R_{R0}+(V_D-V_{D0})\times h))\times p1 \times p2 \quad (1)$$

In this equation, $V_R$ is the rectifier voltage, $R_{R0}$ is a rectifier reference resistance (a resistance value of the resistor 9 at a reference temperature), $V_D$ is the rectifying element voltage, and $V_{D0}$ is a rectifying element reference voltage (a voltage across the positive side rectifying element 84A at the reference temperature). h is a correction factor having a negative value, which is used for correcting the resistance value of the resistor 9 on the basis of variation of the voltage across the positive side rectifying element 84A. The correction factor h is determined depending on a specification of the positive side rectifying element 84A etc.

P1 is a first adjustment factor used for adjusting the value of the output current I calculated from the resistance value of the resistor 9. In the rectifier 8 shown in FIG. 2, not only the positive side rectifying element 84A, but other positive side rectifying elements 84 closer to the output terminal 86 than the positive side rectifying element 84A also serve as a current generating source. Therefore, if the output current I is calculated on the basis of the resistance value of the resistor 9, an error may occur between the calculated output current I and an actual output current. Accordingly, in this embodiment, the adjustment factor p1 is used to eliminate such an error.

P2 is a second adjustment factor which is used for eliminating an effect of over-time change of a characteristic of a specific component on the calculation result of the output current. For example, if over-time change of a characteristic of the positive side rectifying element 84A is not negligible, the value of p2 is set to such a value that the effect due to this change is removed. In the equation (1), an entire of the term of $(V_R/(R_{R0}+(V_D-V_{D0})\times h))$ is multiplied by the adjustment factor p2. However, the position of the adjustment factor P2 in the equation (1) may be changed depending on which one or ones of the components of the rectifier 8 exhibits a non-negligible over-time characteristic change. For example, if only the positive side rectifying element 84A exhibits a non-negligible over-time characteristic change, not the entire of the term of $(V_R/(R_{R0}+(V_D-V_{D0})\times h))$, but only the $V_D$ may be multiplied by the adjustment factor P2. Furthermore, if the characteristics of two or more different components change over time differently, two or more adjustment factors having different values may be used. The adjustment factor P2 may be used as an additive value or a subtractive value, not as a multiplicative value, depending on how the component characteristic vary over time. This adjustment factor P2 is set at a predetermined value when the vehicle generator 1 starts to be used. Thereafter, the communication circuit 53 generates a adjustment factor setting signal in accordance with data indicative of an amount of an over-time characteristic change of a specific component, which is sent from the ECU 10. The value of the adjustment factor P2 is changed in accordance with this adjustment factor setting signal.

The term of $(V_D-V_{D0})\times h$ included in the equation (1) is a temperature-compensating term for the rectifier reference resistance $R_{R0}$ (the resistance value of the resistor 9 at the reference temperature). A basic concept of the equation (1) is in calculating the output current I by dividing the rectifier voltage $V_R$ by the rectifier reference resistance $R_{R0}$ after temperature-compensated depending on the value of the voltage across the positive side rectifying element 84A By adjusting the result of this division by use of the adjustment factors p1, p2, the accuracy of the calculated output current I can be improved. The value of the calculated output current I is sent from the communication circuit 53 to the ECU 10 through the C-terminal. The ECU 10 performs various processings by use of the value of the calculated output current I sent from the vehicle generator 1. For example, the ECU 10 calculates a power generation torque of the vehicle generator 1 by use of this value to perform engine control.

As explained above, the vehicle generator 1 is configured to detect the output current thereof by detecting a voltage difference between specific two points within the rectifier 8 located along a direction in which the output current flows. This eliminates mounting current detecting components that are heavy in weight and have complicated structures on the vehicle generator 1. Accordingly, the vehicle generator 1 of this embodiment is low in production cost and weight compared to the conventional vehicle generator having the function of detecting the output current thereof. The temperature of the rectifier 8 varies intensely. However, since the resistance value of the rectifier 8 is corrected depending on the temperature thereof, the output current can be detected at high accuracy irrespective of the intense temperature variation of the rectifier 8. Since this temperature compensation is performed utilizing the temperature characteristic of the rectifying elements of the rectifier 8, it is not necessary to mount any temperature sensor for detecting the temperature of the rectifier 8 on the vehicle generator 1.

The ECU 10 sends data concerning an over-time characteristic change of a specific component to the vehicle generator 1 to remove the effect of the over-time characteristic change on the calculation result of the output current. This makes it possible to detect the output current in high accuracy for a long time period. The power generation control device 5 can be manufactured by modifying an IC circuit forming a conventional vehicle-use power generation control device to included the function of detecting the output current. Accordingly, the vehicle generator 1 can be manufactured with a very little increase of production cost.

It is a matter of course that various modifications can be made to the above described embodiment as described below. Although the positive side radiating plate 82 has been described as having a horseshoe shape, it may have other shape, for example, a simple rectangular shape. The output current may be calculated on the basis of a voltage difference between two positions respectively near the ends of the negative side radiator plate 83, instead of the ends of the positive side radiating plate 82. It should be noted that calculation of the output current does not necessarily require detecting the voltage difference between the two positions respectively near the two ends of the positive side radiator plate 82. The output current may be calculated on the basis of a voltage difference between the output terminal 86 and a center portion of the positive side radiator plate 82. In this case, the value of the adjustment factor p1 is changed to remove a calculation error. Furthermore, the output current may be calculated on the basis of a voltage difference between any two different positions of the positive side radiating plate 82 along a length direction of the positive side radiating plate 82. The positive side radiator plate 82 is preferably made of a conductive material having a good thermal conductivity, such as an aluminum material, or an alloy containing aluminum.

Figure 3:
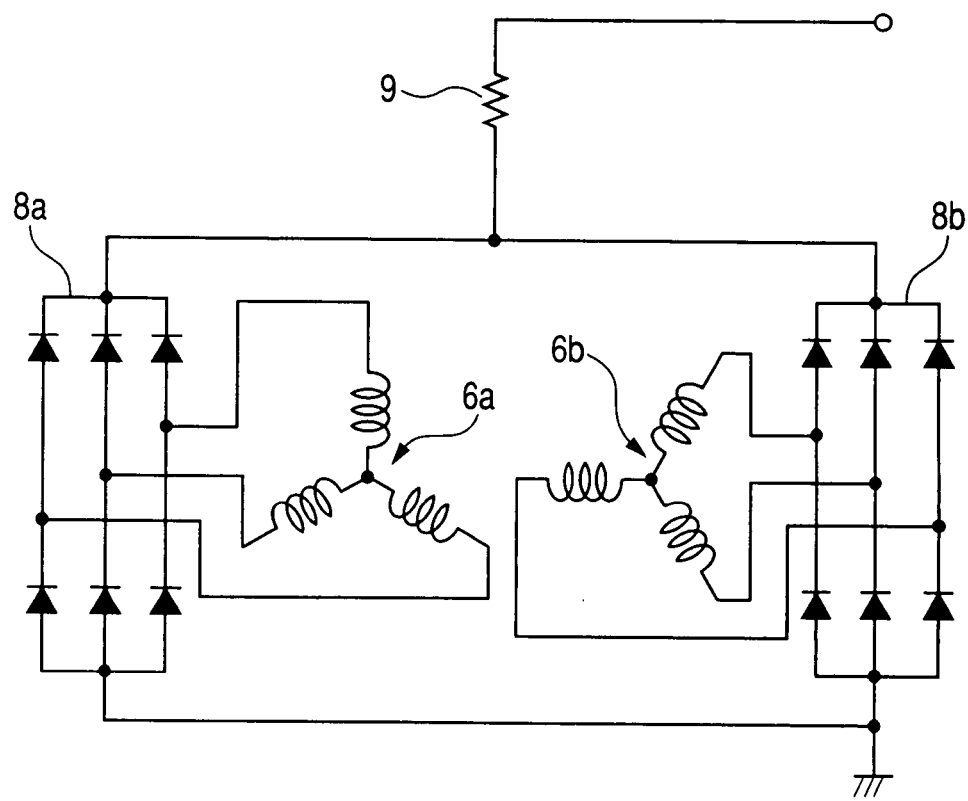
FIG. 3 is a diagram showing two armature windings and two rectifiers of a vehicle generator to which the present invention can be applied.

The present invention is applicable to a vehicle generator having two or more armature windings. For example, when the present invention is applied to a vehicle generator having two armature coils 6a, 6b and two rectifiers 8a, 8b as shown in FIG. 3, the sum of the outputs currents of the rectifiers 8a, 8b can be calculated in the similar way as described above.

The above explained preferred embodiments are exemplary of the invention of the present application which is described solely by the claims appended below. It should be understood that modifications of the preferred embodiments may be made as would occur to one of skill in the art.

What is claimed is:

1. A vehicle generator comprising:

a rotor around which a field winding is wound;

a stator around which an armature winding is wound, said armature winding generating an AC voltage depending on a rotating magnetic field generated by said field winding;

a rectifier rectifying said AC voltage to generate a DC output current, said rectifier having a plurality of rectifying elements mounted to a current path section thereof, said DC output current flowing through said current path section to reach an output terminal of said vehicle generator;

a first voltage detector circuit detecting a voltage difference between two points of said current path section located along a direction in which said output current flows; and an output current calculating circuit calculating a value of said output current on the basis of said voltage difference detected by said first voltage detector circuit and a resistance value between said two points of said current path section.

2. The vehicle generator according to claim 1, further comprising a temperature-compensating circuit correcting said resistance value in accordance with a temperature of said rectifier.

3. The vehicle generator according to claim 2, further comprising a second voltage detector circuit detecting a voltage drop across one of said rectifying elements, said temperature-compensating circuit correcting said resistance value in accordance with said voltage drop detected by said second voltage detector circuit.

4. The vehicle generator according to claim 1, wherein said output current calculating circuit has a function of adjusting calculation result of said DC output current in accordance with an external instruction.

5. The vehicle generator according to claim 4, wherein said external instruction includes data concerning an over-time characteristic change of a specific component of said rectifier.

6. The vehicle generator according to claim 1, further comprising a power control circuit formed in an IC circuit controlling a passage of an excitation current to said field winding, said first voltage detector circuit, and said output current calculating circuit being formed in said IC circuit.

7. The vehicle generator according to claim 3, further comprising a power control circuit formed in an IC circuit controlling a passage of an excitation current to said field winding, said first voltage detector circuit, said second voltage detector circuit, and said output current calculating circuit being formed in said IC circuit.

* * * * *